J. J. KUNTZ.
JACK.
APPLICATION FILED MAR. 24, 1919.

1,342,389.

Patented June 1, 1920.
2 SHEETS—SHEET 1.

WITNESS:
R. A. Thomas

INVENTOR.
J. J. Kuntz.
BY
Victor J. Evans ATTORNEY.

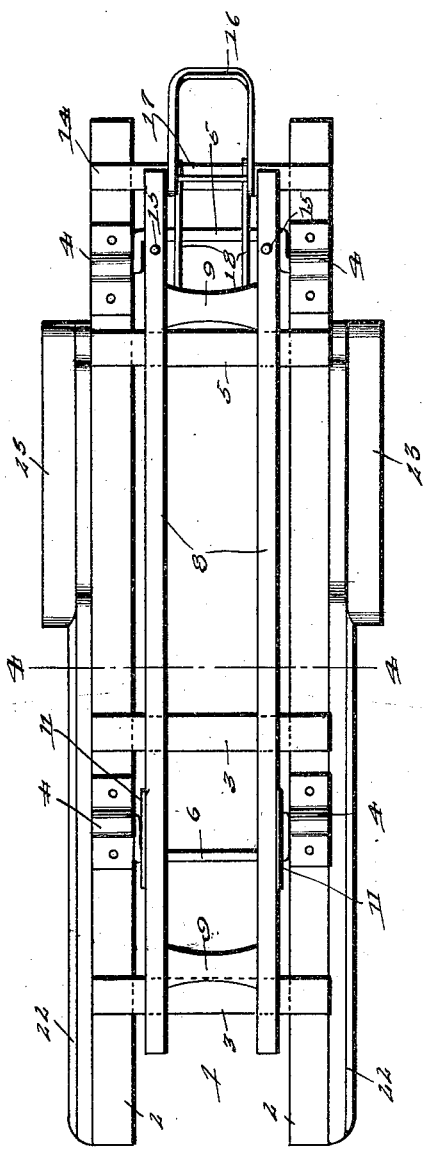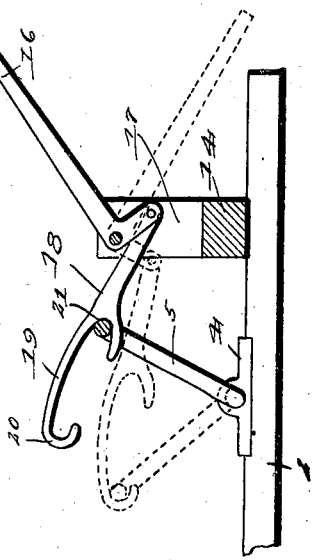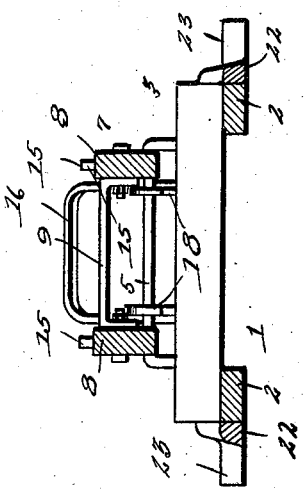

UNITED STATES PATENT OFFICE.

JAKE J. KUNTZ, OF OAKVILLE, IOWA.

JACK.

1,342,389.  Specification of Letters Patent.  Patented June 1, 1920.

Application filed March 24, 1919. Serial No. 284,547.

*To all whom it may concern:*

Be it known that I, JAKE J. KUNTZ, a citizen of the United States, residing at Oakville, in the county of Louisa and State of Iowa, have invented new and useful Improvements in Jacks, of which the following is a specification.

This invention relates to automobile jacks for holding all four wheels of the automobile off the floor.

The principal object of the invention is to provide means whereby the front axle striking the carrier part of the jack will cause the same to move forwardly and upwardly, due to the momentum of the automobile, so that the rear axle will be engaged and lifted by the carrier.

Another object of the invention is to provide means operated by hand for lowering the rear end of the carrier so that the rear wheels will secure traction to enable the automobile to be backed off the jack by its own power.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 3 is a plan view;

Fig. 4 is a cross section on line 4—4 of Fig. 3; and

Fig. 5 is a detailed view of the hand-operated device.

Figure 1:
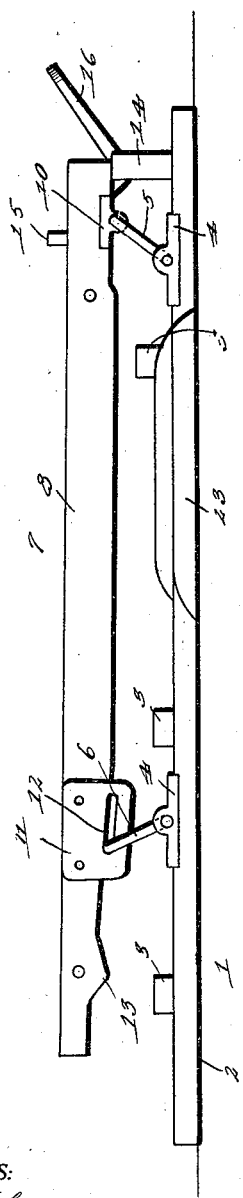
Figure 1 is a side view with the carrier in raised position.
Figure 2:
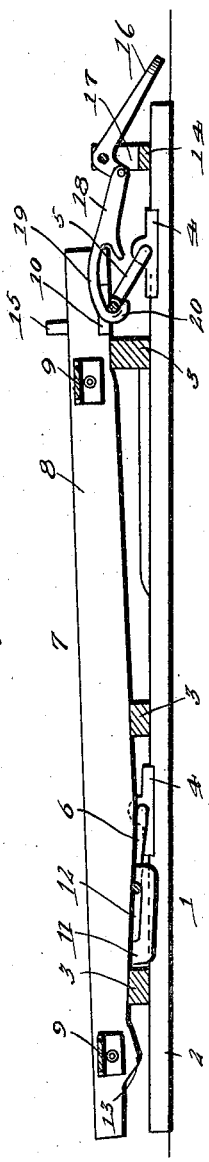
Fig. 2 is a longitudinal section with the carrier in lowered position.

In these views 1 indicates the frame of the device which consists of the two longitudinal beams 2 and the cross pieces 3. Each beam is provided with front and rear bearings 4. These bearings receive the ends of the front crank member 5 and the rear crank member 6. As shown, each of these members is of substantially U-shape with the ends of the legs bent at right angles to engage the bearings.

The carrier 7 consists of two beams 8 placed in parallel relation to each other and connected together by the cross braces 9. The beams are of sufficient length as to engage both the front and rear axles of an automobile. The front ends of the beams of the carrier are provided with the journals 10 to receive the cross piece of the front crank member. An appreciable distance from the rear end of said beams are placed clips or brackets 11 which project downwardly below the beams and are each provided with a slot 12 to receive the cross piece of the rear crank member 6. As shown the slots incline upwardly toward the rear. The rear ends of the beams of the carrier have their lower edges cut away so as to reduce the thickness of this part of the beam but adjacent the rear ends of these beams wedge-shaped projections 13 are left on said lower edges which are adapted to engage the rounded edge of the rearmost cross piece 3 so that when said projections strike said rounded edge when the carrier is lowered, the rear movement of the carrier is facilitated by the tendency of said wedges to slide on the edge. The frontmost cross piece 3 is of greater thickness than the other cross pieces and when the carrier is lowered its front end will engage with said front cross piece and thus the carrier will be held in inclined position with its front end higher than its lower end so that an automobile may be easily run upon the same. A cross piece 14 is placed at the extreme end of the frame and this cross piece is of greater height than the other cross pieces and is so located that when the carrier is in raised position the front end thereof will rest on said cross piece so as to act as a stop to the further movement of said carrier. I may place stops 15 on the front end of the carrier to be be engaged by the front axle.

The means for lowering the carrier consist of a U-shaped lever 16 pivoted on the cross piece 14, which is provided with an opening 17 to receive the bent ends of said lever. A pair of hook members 18 are pivoted to said bent ends and are provided with arc-shaped portions 19 to engage the cross pieces of the front crank member 5. At their extreme ends, these hook members are provided with the hooks 20 and midway of the ends they are provided with the recesses 21. These hooks and recesses act to limit the movement of the crank member on the arc-shaped portions.

I prefer to place guide-pieces 22 on the sides of the frame for guiding the wheels of the automobile into proper position on each side of the device and each of these guide-pieces is provided with a track 23 at its front end to receive the front wheel to elevate the front part of the automobile and thus remove some of the weight off the upwardly moving carrier.

It will thus be seen that when the jack is in position to receive the automobile, the front part of the carrier is resting on the front cross piece 3 and the rear end on the other cross pieces. The rear crank member will be in the forward part of the slots in the brackets. When an automobile is run on the track the front axle will pass over the rear part thereof until it strikes the front raised part or the stops 15 when the momentum of the automobile will cause said carrier to move forwardly therewith. This action will cause the front crank member to rotate and the rear crank member to slide along the slots in the brackets to the rear part thereof. This action will cause the carrier to rise as it is being moved forward and as soon as the rear crank member reaches the end of the slots it will raise the rear end of the carrier and thus lift the rear wheels of the automobile off the floor. It will be seen that the wedge-shaped projections 13 sliding over the edge of the cross piece will facilitate the sliding movement of the rear crank member in the slots and start the upward movement of the rear end of the carrier. The movement of the carrier will continue until its front end engages the cross piece 14 when further movement will be prevented. The stops on said carrier will bring the automobile to a rest. As the forward crank member in its movement passes along the arc-shaped parts of the hook member 18 it will slightly raise said members until it strikes the walls of the recesses and then the further movement of said crank member will carry said hook members with it so as to raise the lever 16. When the automobile is to be moved off the jack the lever 16 is depressed which will cause the hook members to move rearwardly and this movement will cause the forward crank member to swing upwardly into a substantially vertical position and the rear crank member will start to move downwardly. Thus the weight of the automobile will continue downward movement of the rearward crank member and the rear end of the carrier until the projections 13 will strike around the edge of the rear cross pieces and the weight of the carrier and the automobile thereon will cause the inclined sides of the projections to move over the rounded part of the cross pieces and thus move the carrier into its lowered position with the crank member in the front ends of the slots. If the carrier should happen to stick with the projections on the rear cross piece, it would not matter as the rear wheels of the automobile would have traction on the floor and when the engine is started up and the automobile backed, the friction of the front axle on the front part of the carrier would complete the line of the carrier. It will be seen that when the carrier is in its upward position the rear crank member will occupy a position of about 80° while the front crank member will occupy a position of about 110°.

What I claim is:

1. A jack for automobiles comprising a frame, front and rear crank members journaled in said frame, a carrier for engaging the front and rear axles of the automobile, journals at the front end of said carrier for receiving the front crank member, slotted brackets at the rear of the carrier for receiving the rear crank member, cross pieces on the frames for holding the carrier in inclined position and a stop for engaging the front end of the carrier to limit the forward and upward movement of the same.

2. A jack for automobiles, comprising a frame, front and rear crank members journaled in said frame, a carrier having journals in its front end for receiving the front crank member, slotted brackets on the rear part of the carrier for receiving the rear crank member, wedge-shaped projections on the rear part of said carrier, a cross piece on the frame having a part for engaging said projections, a hand lever and hook members connected therewith and engaging the front crank member for lowering the carrier.

In testimony whereof I affix my signature.

JAKE J. KUNTZ.